Feb. 18, 1936.      B. F. FORTIER ET AL      2,030,978
BUMPER
Filed Dec. 4, 1931      5 Sheets-Sheet 1
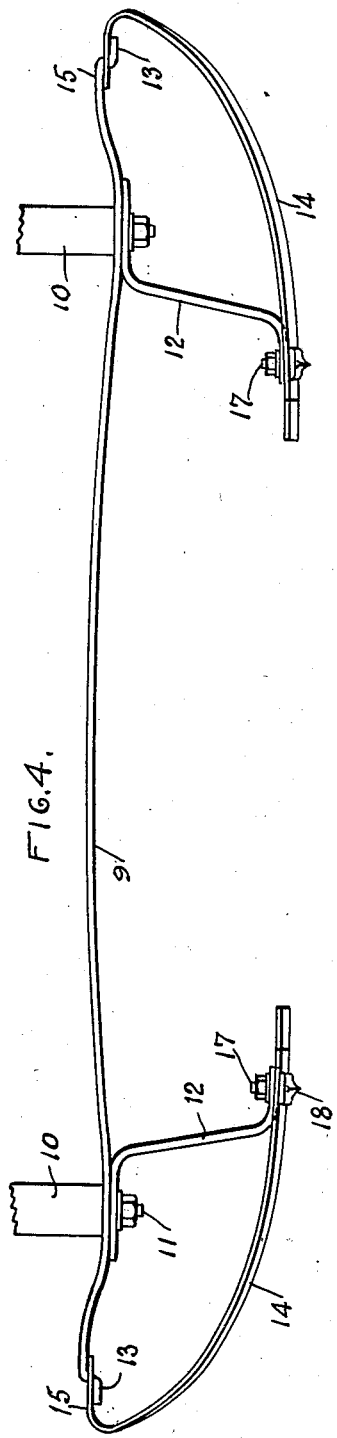
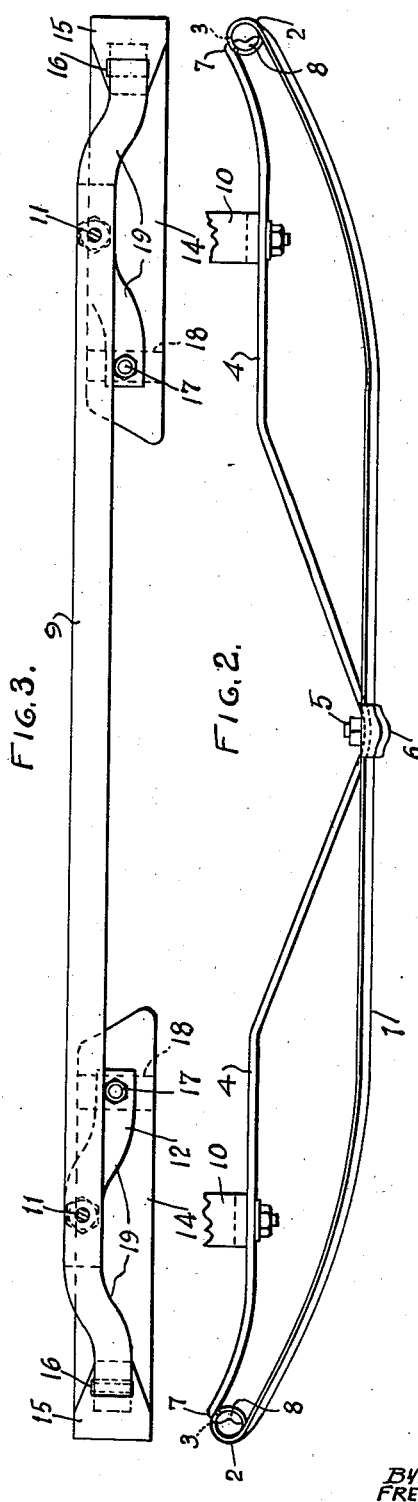
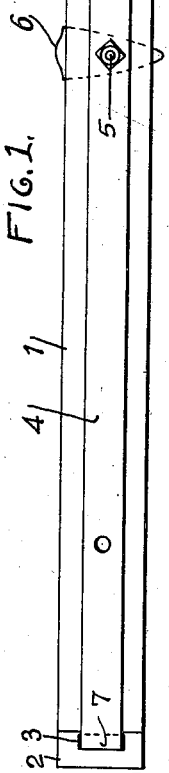
Inventors
BYRON F. FORTIER,
FREDRICK A. MILLER,
Toulmin & Toulmin
Attorneys

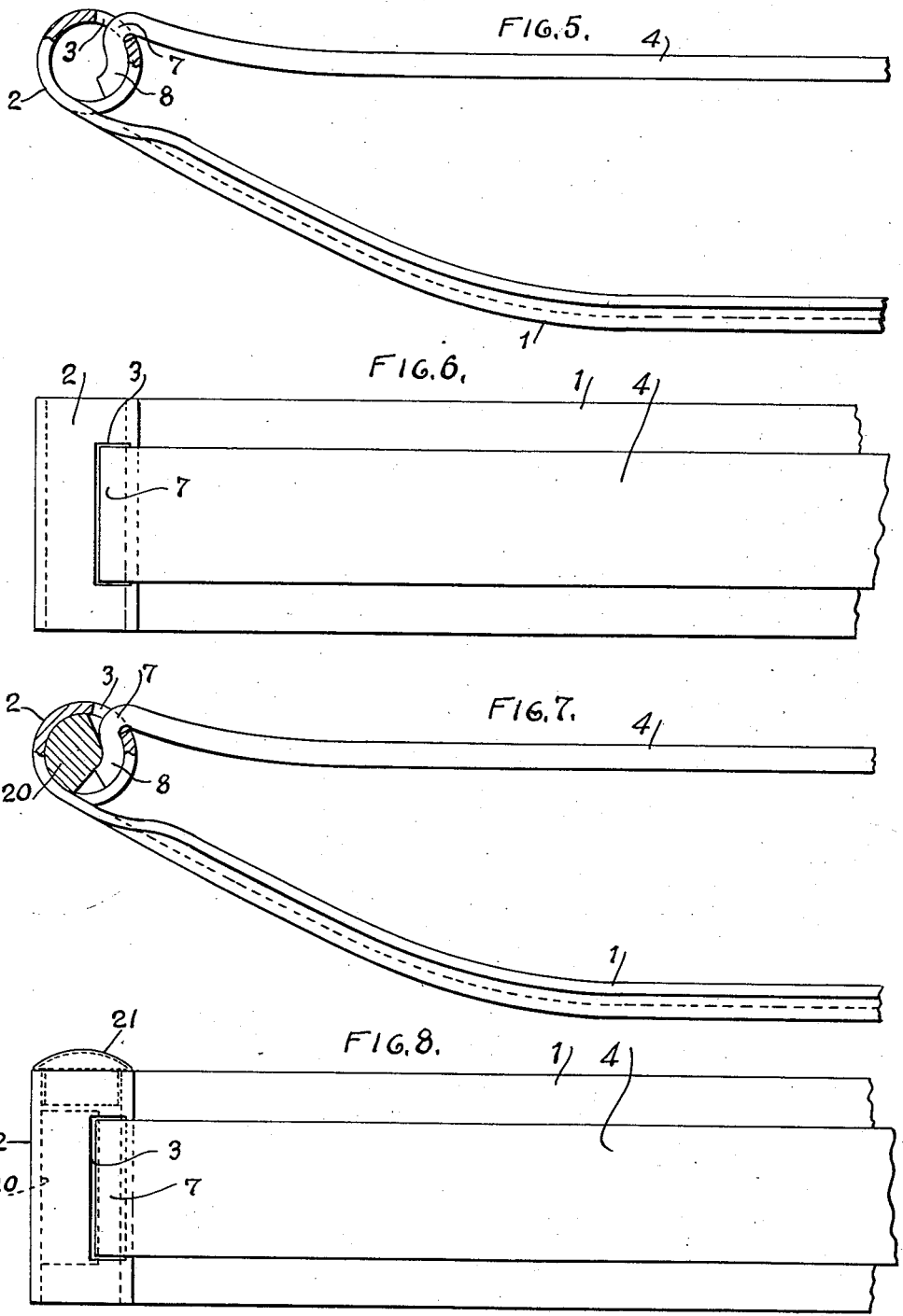

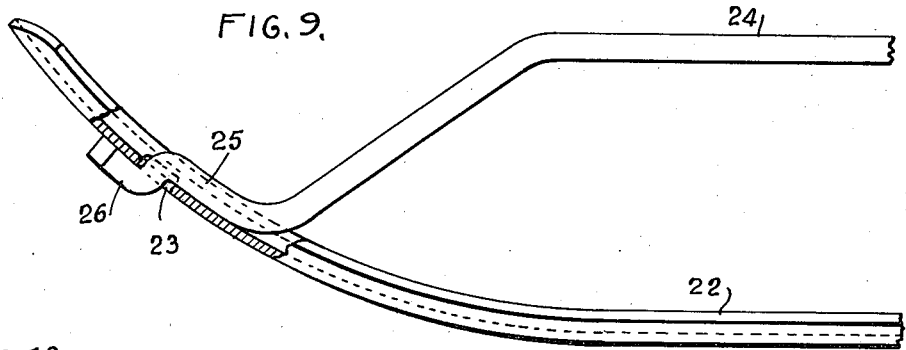
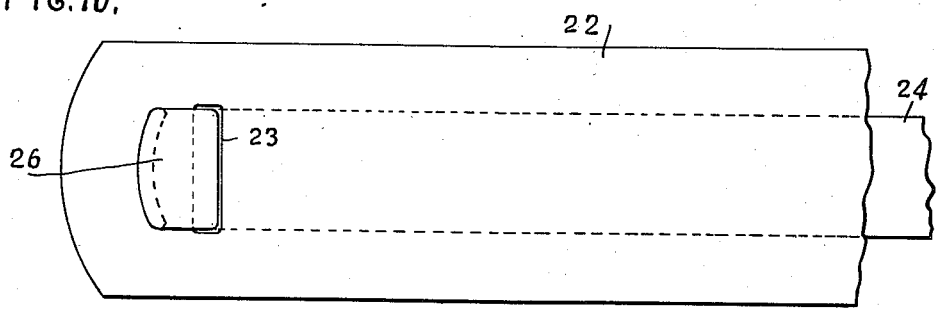
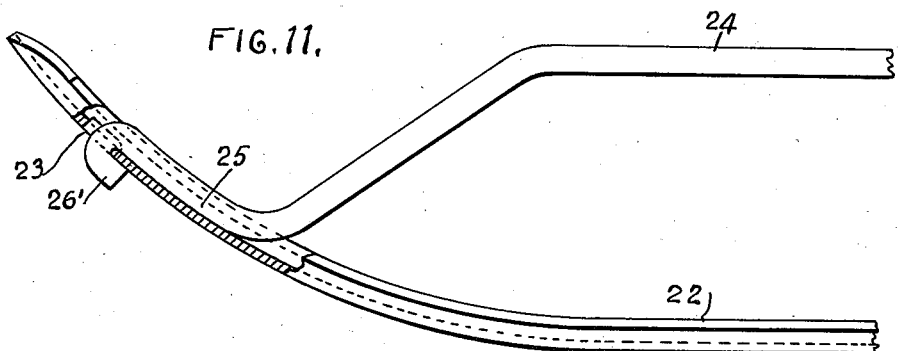
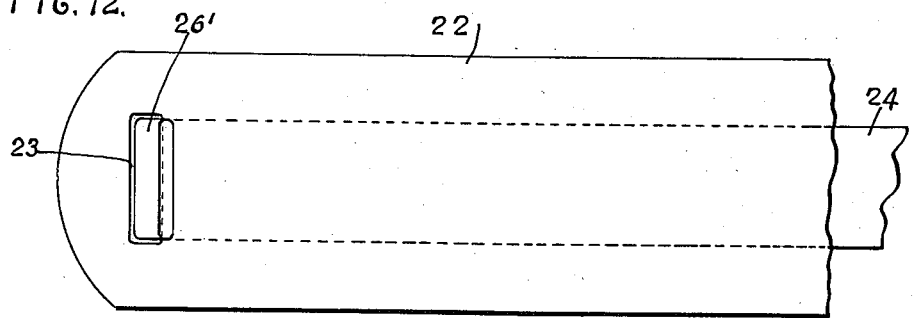

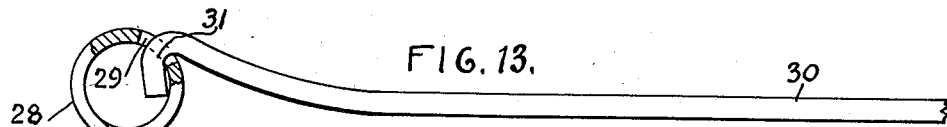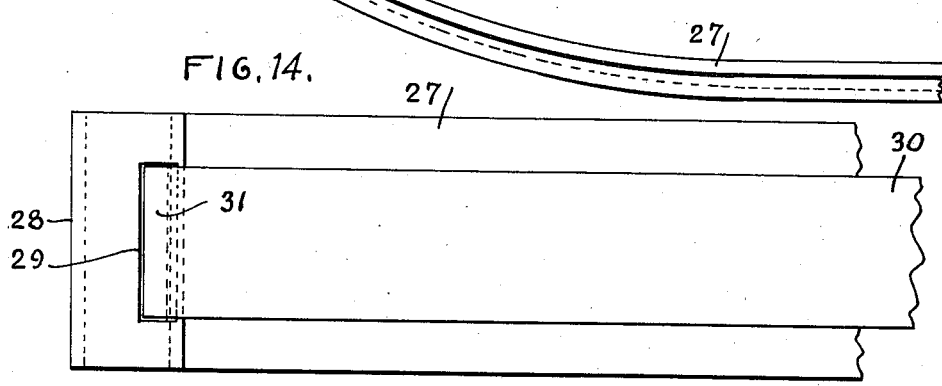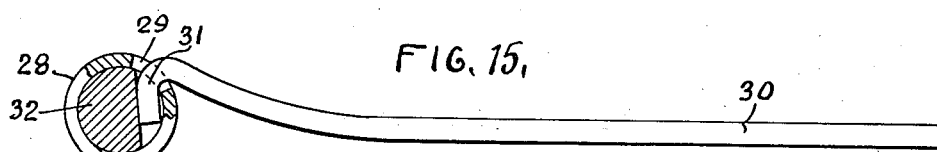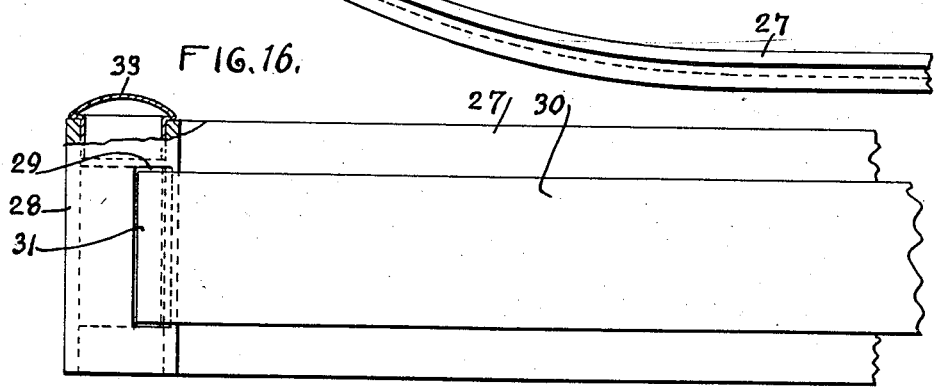

Feb. 18, 1936.  B. F. FORTIER ET AL  2,030,978
BUMPER
Filed Dec. 4, 1931     5 Sheets-Sheet 5
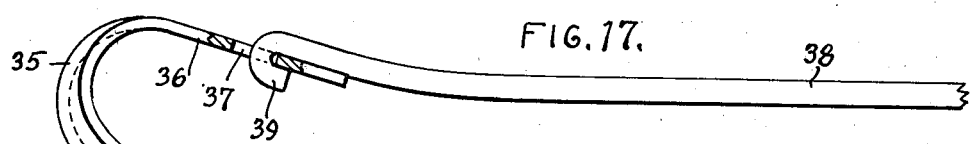
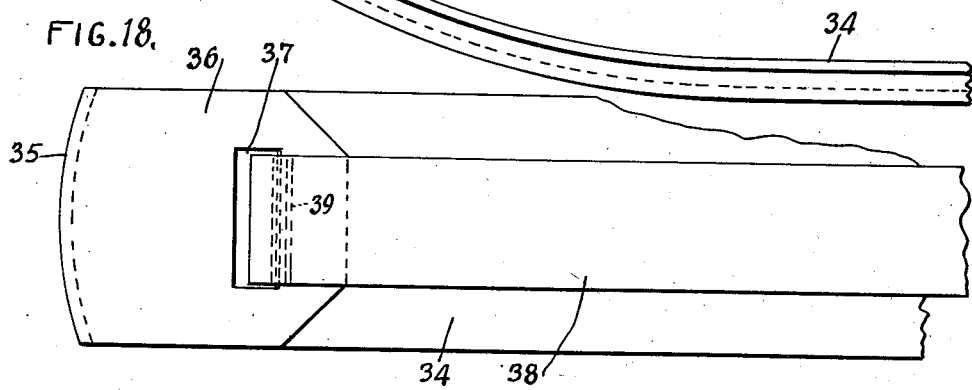
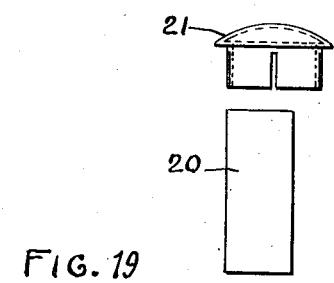
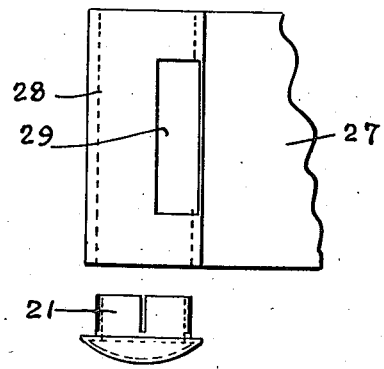
Inventors
BYRON F. FORTIER,
FREDRICK A. MILLER,
BY Toulmin + Toulmin
Attorneys

Patented Feb. 18, 1936

2,030,978

UNITED STATES PATENT OFFICE 2,030,978

BUMPER

Byron F. Fortier and Fredrick A. Miller, Springfield, Ohio, assignors to Louis R. Hildreth, Columbus, Ohio Application December 4, 1931, Serial No. 579,082

16 Claims. (Cl. 293—55)

This invention relates to improvements in bumpers, and has for its object to provide a bumper in which there are a front bar and a back bar connected to each other by interlocking engagement without the necessity of welding or bolting.

It is also an object of this invention to provide a bumper composed of a spring steel front bar and a rear bar in interlocking engagement with each other at their ends, and having their parts so united that this union tends to hold the interlocking parts together.

It is also an object of this invention to provide, in connection with a bumper, a front bumper bar having rolled ends with slots therein, and a back bumper bar with hooked ends to engage in the slots in the rolled ends of the front bar. Means may also be provided for holding the hooked ends of the back bar in the rolled ends of the front bar, such as plugs and ornamental caps.

It is also an object of this invention to provide a bumper having a supporting bar with offset ends to which the bumpers are attached by having slots therein to receive the offset ends of the supporting bar.

It is also an object of this invention to provide a front bumper bar having curved ends, and a back bumper bar with curved ends arranged in contact with the surface of the front bar and having its ends bent and inserted through the slots in the front bumper bar.

These and other advantages will appear from the following description taken in connection with the drawings.

Referring to the drawings:

Figure 1 is a rear elevation of one form of applicants' bumper.

Figure 2 is a top plan view of the form shown in Figure 1.

Figure 3 is a front elevation of a supporting bar with bumperettes on the ends thereof.

Figure 4 is a top plan view of the bumper as shown in Figure 3.

Figure 5 is an enlarged top plan view of one end of the bumper as shown in Figure 1, with the end partly in section.

Figure 6 is a view similar to Figure 5 but a rear elevation thereof.

Figure 7 is a view similar to Figure 5 but with a plug inserted in the rolled end.

Figure 8 is a view similar to Figure 6 but with the plug inserted in the rolled end.

Figure 9 is a top plan view of one end of a bumper according to a modified form, in which the end of the front bar is partly in section.

Figure 10 is a front elevation of the end of the bumper as shown in Figure 9.

Figure 11 is a top plan view of a slightly modified form of bumper, in which the back bar is bent to form a hook.

Figure 12 is a front elevation of the bumper as shown in Figure 11.

Figure 13 is a slightly modified form of bumper bar showing in plan view one end thereof, with the rolled end partly in section.

Figure 14 is a rear elevation of the form shown in Figure 13.

Figure 15 is a view similar to Figure 13 but with the plug located in the rolled end for holding the back bar in position.

Figure 16 is a view similar to Figure 14, with the plug and cap inserted in the rolled end with the cap and rolled end partly in section.

Figure 17 is another form of bumper, in which the front bar has its ends looped, with the back bar attached to the looped ends by means of slots and hooks.

Figure 18 is a rear elevation of the form of bumper shown in Figure 17.

Figure 19 is a view showing the lug for holding the hook on the end of the back bar in engagement with the slot in the rolled end of the front bar, together with the caps that fit in each end of the rolled end of the front bar. This view also shows one end of the front bar having the rolled end and the slot therein.

According to the form shown in Figure 1, the bumper is composed of two bars, a front bar 1 having each end rolled, as indicated by the numeral 2, with a slot 3 therein. The ends of this bar are slightly curved and are connected by means of a back bar 4, which has on each end a hook 7. The middle part of the back bar is bent toward the front bar, and is attached thereto by means of a bolt 5, which passes through both bars and serves to hold an ornamental plate 6 in the central part of the front bar.

As shown in Figure 2, the bars contact with each other at their ends and at their centers so there is, at each end of the bumper, a spring loop. The hooked ends of the bumper bar fit in the slots 3 of the rolled ends of the front bar, and have their immediate ends of the hooked parts bent or curved, as indicated by the numeral 8, to correspond to the internal curvature of the rolled ends.

As shown in Figure 2, when these hooks are placed within the slots the curved ends of the hook members closely engage the rolled ends of the front bar. In order to hold these parts assembled, as shown in this figure, a plug may be inserted within the rolled end and the curved part 8 of the back bar. By this means the bars are held together and cannot be disconnected.

In Figures 3 and 4 bumperettes are shown and the bar for supporting these bumperettes on some part of the frame of an automobile. The supporting bar is indicated by the numeral 9, which serves as a bar that extends crosswise the rear of the car and is attached to some part of the frame 10 by means of bolts 11 which pass through holes in the supporting bar, and also holes in brackets 12. Each end of the supporting bar has an offset part 13 for supporting one end of a bumperette 14. This end of the bumperette is bent to form a looped end 15, in which there is a slot 16 for receiving the offset 13 of the supporting bar.

The other ends of the bumperettes are supported by the brackets 12 by means of bolts 17 which pass through the ends of the brackets, the ends of the bumperettes and serve to fasten these two together, together with an ornamental plate 18. The ornamental plate may serve as the head of the bolt, or the bolt may be otherwise attached to the ornamental plate.

As shown in Figure 3, each end of the supporting bar is curved upwardly adjacent its ends, with the end extending in a line substantially parallel with the body of the supporting bar. The brackets 12 also curve upwardly from the bolt 11 so that the free ends of the supporting bar 9 and the ends of the brackets remote from the bolts 11 are substantially in a straight line near the upper edge of the body of the supporting bar. By this means the bumperettes are given an additional resiliency; that is, a resiliency independent of the natural resiliency of the bar and the brackets. The upwardly extending parts of the brackets 12 and the ends of the bar 9 are indicated by the numeral 19.

In Figures 5, 6, 7 and 8 enlarged end views of the bumper are shown. Figure 5 shows the nature of the connection between the ends of the two bars. In Figure 7 there is shown inserted in the rolled end of the front bar and the curved hooked end of the back bar a plug 20 for preventing the back bar from being disconnected from the front bar. This plug is substantially as long as the width of the back bar, thereby leaving a considerable space at each end of the rolled end for supporting an ornamental cap 21. This cap has a head and a cylindrical barrel part that is resilient and fits closely within the ends of the rolled part so it may be slipped onto or removed from the rolled ends, but with sufficient friction to hold it in place under ordinary conditions. These caps also serve to hold the plug in place. The plug and caps for each end of the plug are shown in Figure 19.

In Figures 9 to 12 a slightly modified form of bumper is shown. In this form the front bumper is indicated by the numeral 22, and has curved ends, each end having a slot 23 therein. The back bar is indicated by the numeral 24 and has its ends bent toward the front bar and bent so as to engage the front bar along a part of the surface thereof as indicated by the numeral 25. The ends of the back bar are offset, as indicated by the numeral 26, and project through the slots in the ends of the front bar and engage the front surfaces of the curved ends of the front bar, as shown in Figure 9.

In Figures 11 and 12 a bumper similar to that shown in Figures 9 and 10 is shown. Instead of the back bar having offset ends the ends in this form are bent to form hooks 26', that double back and engage opposite sides of the bumper bar adjacent the end slots. In all other respects these two bars are similar.

In Figures 13 to 16 a form of bumper very similar to that shown in Figures 1 and 2 is shown. In this form the front bar is indicated by the numeral 27, and has on each end a rolled part 28. The back bar is indicated by the numeral 30, and has on each end a hook 31 which projects into a slot 29 in the rolled ends of the front bar. The hook member 31 does not have any curved part, such as shown in Figures 5 and 7, the end being straight.

In the rolled ends are placed plugs 32, which are round for about two-thirds of their perimeter, with the other part of the perimeter forming a flat surface to engage the flat end of the back bar, as shown in Figure 15. The length of this plug is substantially equal to the width of the back bar so that considerable space is left between the ends of the plug and the sides of the front bar, which is much wider than the back bar in all instances. This space is filled by means of a cap 33, which has a cylindrical projection fitting into the open ends of the rolled end of the bar. The form of cap is shown in Figures 16 and 19. The cap is ornamental and adds to the beauty of the end of the bumper. The bars are so interlocked that impact pressure thereon seems to more firmly interlock them.

In Figures 17 and 18 a further modification is shown, in which the front bar is indicated by the numeral 34 and has on each end a loop 35, terminating in free ends extending toward each other. Each free end 36 has therein a slot 37. The back bar is indicated by the numeral 38, and has a hook 39 on each end, fitting within the slot 37 and engaging the bar adjacent the slot.

In all the modified forms shown the parts are held in engagement with each other by means of hooks formed integral with one part and engaging a slot in another part, or by offsets on one part engaging slots in another part.

The separate elements of the bumpers are easily manufactured and when manufactured are easily assembled, and when assembled are durable, lasting and easily maintained in operative condition.

It will be understood that we desire to comprehend within our invention such modifications as come within the scope of our claims and our invention.

Having thus fully described our invention, what we claim as new and desire to secure by Letters Patent, is:

1. In a bumper, a front bar having rolled ends and a slot in each rolled end, and a back bar having its ends bent reversely to form a hook bent around one edge of the slots and curved arcuately at said ends with a curvature conforming to the curvature of the rolled ends.

2. In a bumper, a front bar having rolled ends and a slot in each rolled end, a back bar having its ends bent reversely to form a hook bent around one edge of the slots and curved arcuately at said ends with a curvature conforming to the curvature of the rolled ends, and means to prevent the back bar becoming disengaged from the front bar.

3. In a bumper, a front bar having rolled ends and a slot in each rolled end, a back bar having its ends bent reversely to form a hook bent around one edge of the slots and curved to fit the curvature of the rolled ends, and a plug in each rolled end engaging the curved part of the back bar ends to prevent the back bar becoming disengaged from the front bar.

4. In a bumper, a front bar having rolled ends and a slot in each rolled end, and a back bar having each end bent reversely to form a hook bent around an edge of one of said slots, said hook being curved outwardly to conform to the curvature of the rolled end.

5. In a bumper, a front bar having rolled ends and a slot in each rolled end, a back bar having each end bent reversely to form a hook bent around an edge of one of said slots, said hook being curved outwardly to conform to the curvature of the rolled end, and a plug in each rolled end engaging the outwardly curved end of the back bar to prevent the back bar becoming detached from the front bar.

6. In a bumper, a bar having each end offset, a pair of bumper members, each having a slot in one end to receive the offset end of the bar, and means to connect the other ends of the bumper members to the bar.

7. In a bumper, a bar having each end offset, a pair of bumper members, each bumper member having one end bent and slotted to receive the offset end of the bar, and a bracket between the other end of each bumper member and the bar.

8. In a bumper, a bar having stop means adjacent each end, a pair of bumper members each having a slot to receive one end of the bar with the bumper member against the stop means, and bracket connections between the bar and the bumper members.

9. In a bumper, a bar having stop means adjacent each end, a pair of bumper members, each having at one end a slot to receive one end of the bar with the bumper member against the stop means, and a bracket between the other end of each bumper member and the bar.

10. In a bumper, a front bar having a slot in each end, and a spaced back bar having its ends bent reversely to form hooks bent around an edge of the slots, said ends at points preceding the hooks engaging the sides of the front bar adjacent the slots.

11. In a bumper, a bumper bar having rolled ends with slots therein, a second bumper bar having each end bent reversely to form a hook fitting closely around the edge of its corresponding slot, plugs in the rolled ends engaging the hooks to prevent detachment, and a cap member in each end of each rolled end.

12. In a bumper, a bumper bar having each end rolled and a slot therein, a second bar having each end bent reversely to form a hook fitting closely around the edge of its corresponding slot, a plug in each rolled end engaging the hook therein, a cap at each end of the plug, and means for connecting together the central parts of said bars.

13. In a bumper, a bar having a transverse cylinder on each end and a longitudinal slot in each cylinder less in length than the length of the cylinder, a second bar having hooks on its ends fitting in said slots, a plug in each cylinder engaging the hook therein, and a cap on each end of each cylinder, each cap consisting of a head and a resilient projection fitting in the end of the cylinder.

14. In a bumper, a bar having a transverse cylinder on each end and a longitudinal slot in each cylinder less in length than the length of the cylinder, a second bar having its ends bent to form hooks for engaging the cylinder in the slots, a plug in each cylinder engaging the hook therein, a cap on each end of each cylinder, and a resilient projection on the cap fitting in the cylinder end.

15. In a bumper, a front bar having looped ends with slots therein, a back bar having its ends projecting through the slots and interlocked with the looped ends of the front bar, said ends being bent at an angle to the back bar and curved to fit the engaging interior portion of the front bar loops, a plug in each loop having one part of its surface engaging the interior of the front bar loop opposite the part of the loop engaged by the bent end of the back bar, and another part engaging the inside of said bent end of the back bar to prevent the interlocking ends of said bars from becoming unlocked under impact.

16. In a bumper, a front bar having looped ends with slots therein, a back bar having its ends projecting through the slots and interlocked with the looped ends of the front bar, said ends being bent at an angle to the back bar and curved to fit the engaging interior portion of the front bar loops, a plug in each loop having one part of its surface engaging the interior of the front bar loop opposite the part of the loop engaged by the bent end of the back bar, and another part engaging the inside of said bent end of the back bar to prevent the interlocking ends of said bars from becoming unlocked under impact, said plugs being of lesser diameter than the interior of said front bar loops.

BYRON F. FORTIER.
FREDRICK A. MILLER.